United States Patent [19]

Kamo

[11] Patent Number: 5,200,381

[45] Date of Patent: Apr. 6, 1993

[54] METHOD OF PREPARING CATALYST FOR HYDROGENATION OF HYDROCARBON OIL

[75] Inventor: Tetsuro Kamo, Ichikawa, Japan

[73] Assignee: Sumitomo Metal Mining Company Limited, Tokyo, Japan

[21] Appl. No.: 774,339

[22] Filed: Oct. 10, 1991

[30] Foreign Application Priority Data

Oct. 17, 1990 [JP] Japan .................................. 2-278057

[51] Int. Cl.$^5$ ............................................. B01J 31/04
[52] U.S. Cl. .................................... 502/170; 502/313; 502/314; 502/315
[58] Field of Search ................. 502/170, 313, 314, 315

[56] References Cited

U.S. PATENT DOCUMENTS

| | | | |
|---|---|---|---|
| 4,455,390 | 6/1984 | Ting et al. | 502/314 X |
| 4,760,045 | 7/1988 | Oishi et al. | 502/313 X |
| 4,837,193 | 6/1989 | Akizuki et al. | 502/313 X |
| 4,879,265 | 11/1989 | Simpson et al. | 502/314 X |
| 4,981,832 | 1/1991 | Tawara et al. | 502/314 X |

*Primary Examiner*—Patrick P. Garvin
*Attorney, Agent, or Firm*—Watson, Cole, Grindle & Watson

[57] ABSTRACT

A method of preparing a catalyst for hydrogenation of a hydrocarbon oil, wherein an aqueous solution containing a metal of Group VI of the Periodic Table and a metal of Group VIII of the same, along with a hydroxycarboxylic acid and optionally phosphoric acid is added to a carrier substance consisting essentially of at least one of an inorganic oxide and an inorganic hydrate, and the resulting blend is kneaded, shaped and thereafter dried at a temperature not higher than 200° C. The catalyst has a high catalyst activity and is used for hydrogenation of a hydrocarbon oil, especially satisfying the requirement of reducing the sulfur content in a light oil.

16 Claims, No Drawings

METHOD OF PREPARING CATALYST FOR HYDROGENATION OF HYDROCARBON OIL

FIELD OF THE INVENTION

The present invention relates to a method of preparing an extremely highly active catalyst for hydrogenation of a hydrocarbon oil.

BACKGROUND OF THE INVENTION

In the hydrogenation of a hydrocarbon oil in the presence of hydrogen for hydrogen addition, desulfurization, denitrogenation, decomposition or the like, a hydrogenating catalyst composed of a catalyst carrier of a porous inorganic oxide, such as alumina, titania or silica, and active metal components of Group VI of the Periodic Table of Mo or W and the Group VIII of same of Ni or Co, as carried on the carrier, is used. In the hydrogenation catalyst of this type, in general, the above-mentioned active metals as carried on the catalyst carrier are in the form of their oxides Since such metal oxides are inactive as they are, the catalyst with such metal oxide cannot be applied to hydrogenation. Therefore, the metal oxides are necessarily activated, by converting them into the corresponding metal sulfides. For this reason, after the above-mentioned catalyst has been placed in a device for hydrogenation of a hydrocarbon oil, an adequate pre-sulfurization treatment is indispensable, wherein the catalyst layer in the device is necessarily sulfurized by introducing a hydrocarbon oil containing a dissolved agent under heat. It is known that the active site of the thus-pretreated catalyst is formed on the surfaces of the resulting active metal sulfides so that the total number of active sites will increase with an increase in the exposed surface area of the active metal sulfides, yielding, a high catalyst activity. An increase in exposed surface area of the active metal sulfides may be attained by enhanced dispersion of the active metal sulfides as carried on the catalyst carrier or by minimization of the crystal size of the respective active metal sulfides. Methods of preparing a catalyst having fine crystals of active metal sulfides finely dispersed and carried on a carrier have been disclosed. For instance, Japanese Patent Application Laid-Open Nos. 59-102442 and 59-69147 mention a series of methods of preparing a catalyst in which a catalyst carrier such as an alumina is dipped in an aqueous solution of active metals containing a carboxylic acid, such as citric acid or malic acid, as a complexing agent for active metals and thereafter it is fired. EP 0181035(A2) mentions a method of preparing a catalyst in which an organic compound having a nitrogen-containing ligand (e.g., amino group, cyano group) such as nitriloacetic acid, ethylenediaminetetraacetic acid or diethylenetriamine is used as a complexing agent and is added to an aqueous solution of active metals, a catalyst carrier such as an alumina or silica is dipped in the resulting aqueous solution of active metals, and the catalyst composed of active metals carried on the catalyst carrier is then dried at a temperature of not higher than 200° C. without firing.

In accordance with the method of adding a carboxylic acid as a complexing agent followed by firing, the carboxylic acid added is effective for elevating the stability of the active metal-dipping solution as it acts as a complexing agent for active metals and additionally the acid is also effective for inhibiting coagulation of active metals. In the method, however, the active metals will finally coagulate because of the final firing step so that the finally obtained catalyst by the method cannot have a sufficiently improved catalyst activity. The method is defective in this point. On the other hand, in accordance with the method as disclosed in EP 0181035(A2), since the active metal ions such as Mo or Ni ions are firmly coordinated with the nitrogen-containing compound, such ions are carried on the carrier in the form of a highly dispersed condition. In addition, since the catalyst with the carrier is not calcined but is merely dried at a low temperature of not higher than 200° C., the dispersion of the active metals is finally maintained as it is. Further, since the active metal ions are directly formed into sulfides thereof without forming oxides thereof by pre-sulfurization, the finally obtained hydrogenation catalyst may have an extremely highly dispersed state. For these reasons, the catalyst prepared by the method has a higher activity than any other conventional catalysts, but it cannot still does not have a high enough hydrogenation and desulfurization activity enough to meet the recent demand of reducing the sulfur content in a light oil (precisely, to 0.05% by weight or less as the sulfur content in a light oil) for solving the problem resulting from the current legal controls on gaseous wastes. Additionally, since the catalyst contains a nitrogen-containing organic compound such as nitriloacetic acid or the like, there is a problem that the organic compound would be decomposed in the pre-sulfurization step to generate a toxic gas such as hydrogen cyanide.

SUMMARY OF THE INVENTION

The object of the present invention is to provide a method of preparing a highly active catalyst which may satisfy the above-mentioned requirement of reducing the sulfur content in a light oil.

The present inventor repeatedly studied for the purpose of solving the above-mentioned problems in the prior arts and of attaining the above-mentioned object and, as a result, has found that the object can be attained by adding a hydroxycarboxylic acid, as a complexing agent, to a catalyst composed of base metals and optionally phosphoric acid as carried on a carrier followed by kneading and shaping the resulting carrier blend and drying the shaped carrier at a temperature not higher than 200° C. On the basis of the finding, the inventor has achieved the present invention.

Specifically, in accordance with a first embodiment of the present invention, there is provided a method of preparing a catalyst for hydrogenation of a hydrocarbon oil, in which an aqueous solution containing a metal of Group VI of the Periodic Table and a metal of Group VIII of the same along with a hydroxycarboxylic acid is added to a carrier substance consisting essentially of at least one of an inorganic oxide and an inorganic hydrate, and the resulting blend is kneaded, shaped and thereafter dried at a temperature not higher than 200° C.

In accordance with a second embodiment of the present invention, there is provided a method of preparing a catalyst for hydrogenation of a hydrocarbon oil in which an aqueous solution containing a metal of Group VI of the Periodic Table and a metal of Group VIII of the same along with a hydroxycarboxylic acid and phosphoric acid is added to a carrier substance consisting essentially of at least one of an inorganic oxide and an inorganic hydrate, and the resulting blend is kneaded, shaped and thereafter dried at a temperature not higher than 200° C.

DETAILED DESCRIPTION OF THE INVENTION

In the present invention, at least one selected from alumina, silica, titania, zirconia, and their hydrates is used as a catalyst carrier substance in a conventional manner.

As metal of the Group VI of the Periodic Table, at least one of Mo and W is used; and as the metal of Group VIII of the same, at least one of Co and Ni is used.

As examples of a hydroxycarboxylic acid usable as a complexing agent in the present invention, there are mentioned, for example, glycolic acid, hydroxypropionic acid, hydroxybutyric acid, hydroxyhexanoic acid, tartaric acid, malic acid, glyceric acid, citric acid, gluconic acid, etc.

As phosphoric acid, anyone of orthophosphoric acid, metaphosphoric acid, pyrophosphoric acid, triphosphoric acid and tetraphosphoric acid can be used. A soluble salt of the acid such as nickel phosphate may also be used.

The amount of the metal of Mo or W of Group VI of the Periodic Table to be carried on the carrier is desirably from 5 to 30% by weight as its oxide. The amount of the metal of Ni or Co of Group VIII of the same to be carried on the carrier is desirably from 1 to 8% by weight as its oxide If the amounts of such active metals to be carried on the carrier are less than those falling within the abovementioned ranges, a highly active catalyst cannot be obtained by the method of the present invention. On the other hand, if they are more than those falling within the above-mentioned ranges, the pores of the carrier will be clogged with the active metals so that internal diffusion of a hydrocarbon oil in the catalyst will be inhibited and the activity of the catalyst will be poor.

The amount of the hydroxycarboxylic acid to be added to the catalyst is from 0.3 to 5 molar times of the total molar number of the metals of Group VI and Group VIII. If the amount of the acid added is less than 0.3 molar times, it will be insufficient for forming a coordination complex of the active metals so that a highly active catalyst cannot be obtained. If, however, the amount of the acid added is more than 5 molar times, the activity of the catalyst would no more increase but a carbonaceous material would rather disadvantageously precipitate to clog the pores of the catalyst.

Phosphorus is desired to be in the catalyst in an amount of from 0.1 to 8% by weight as $P_2O_5$, whereby the activity of the catalyst is elevated further.

The drying temperature of drying the catalyst is not higher than 200° C. In this regard, if the temperature is higher than 200° C., the added complexing agent will disadvantageously decompose.

In accordance with the method of the present invention, an aqueous solution as obtained by blending the above-mentioned components, each in a determined amount, is added to the carrier substance and further kneaded and shaped and thereafter dried at a temperature not higher than 200° C. The catalyst of the present invention thus prepared under the above-mentioned conditions is in the form of a coordination compound composed of the active metal ions of Mo, W, Ni and/or Co ions and the added hydroxycarboxylic acid. The coordination compound is stabilized and carried on the catalyst carrier. Though not clear, the reason why the activity of the catalyst as obtained by the use of a hydroxycarboxylic acid as a complexing agent is much higher than any other conventional catalyst as prepared by the use of a nitrogen-containing compound such as nitriloacetic acid, ethylenediaminetetraacetic acid or diethylenetriamine as a complexing agent could be considered to be because the decomposition behavior of the respective complexing agents would have some relation to the dispersibility of active metal sulfides since hydroxycarboxylic acids and nitrogen-containing organic compounds differ from each other in the decomposition behaviors thereof.

The present invention will now be explained in more detail by way of the following examples, which, however, are not intended to restrict the scope of the present invention.

EXAMPLE 1

500 ml of an aqueous solution of active metals, comprising 124 g of molybdenum trioxide, 36 g of cobalt carbonate (Co content: 49% by weight), 495 g of glyceric acid as a complexing agent, and water, was added to 1000 g of alumina hydrate (water content: 60% by weight), and kneaded under heat at 80° C. The resulting blend was shaped into a cylinder form having a diameter of 1.6 mm through an extruder. This was then dried at 100° C. for 16 hours to obtain a catalyst sample (Catalyst-A). Regarding the active metal contents in Catalyst A, Mo content therein was 22% by weight as $MoO_3$, and Co content therein was 4% by weight as CoO. The amount of the glyceric acid added was 4 molar times of the total molar number of the metal of Group VI and the metal of Group VIII. As an activity test of Catalyst-A thus obtained, a Kuwait normal pressure light oil having the following properties was subjected to hydrogenation and desulfurization with Catalyst-A.

| | |
|---|---|
| Specific gravity (15/4° C.) | 0.844 |
| Sulfur content (wt %) | 1.55 |
| Distillation property | |
| Initial distillation point (°C.) | 231 |
| 50 vol. % point (°C.) | 313 |
| Final point (°C.) | 390 |
| The reaction was effected under the conditions mentioned below, using a flow reactor system. | |
| Amount of catalyst (ml) | 15 |
| Liquid space velocity of crude oil ($hr^{-1}$) | 2 |
| Hydrogen pressure for reaction ($kg/cm^2G$) | 30 |
| Reaction temperature (°C.) | 330 |
| Ratio of hydrogen/oil flow (N1/1) | 300 |
| Oil flow period (hr) | 88 |

The dehydrogenation and desulfurization activity of Catalyst-A is represented by a relative value of the reaction rate constant. Precisely, a rate constant of the catalyst sample (Catalyst-A) is calculated out as the desulfurization rate is considered to be proportional to the 1.75th power of the sulfur content in the oil after the treatment, and a relative rate constant of Catalyst-A is obtained on the basis of Catalyst-L (Comparative Example 2 which will be mentioned below) having a standard rate constant of 100.

EXAMPLE 2

Catalyst-B was prepared in the same manner as in Example 1, except that 27 g of 85% phosphoric acid was further added to the aqueous solution of active metals. The activity of Catalyst-B thus prepared was tested in the same manner as in Example 1. Regarding the active metal contents in the catalyst sample, Mo content was 22% by weight as $MoO_3$, Co content was 4% by weight as CoO and P content was 3% by weight as $P_2O_5$. The amount of the glyceric acid added was 4 molar times of the total molar number of the metals of Group VI and Group VIII. The relative rate constant of the catalyst sample is shown in the Table mentioned below.

EXAMPLE 3

400 ml of an aqueous solution of active metals, comprising 124 g of molybdenum trioxide, 36 g of cobalt carbonate (Co content: 49% by weight), 27 g of 85% phosphoric acid, 228 g of tartaric acid and water, was added to 1000 g of the abovementioned alumina hydrate, and kneaded under heat at 80° C. The resulting blend was shaped into a cylinder form having a diameter of 1.6 mm through an extruder. This was then dried at 100° C. for 16 hours to obtain a catalyst sample (Catalyst-C). Regarding the active metal contents in Catalyst-C, Mo content therein was 22% by weight as $MoO_3$, Co content therein was 4% by weight as CoO and P content therein was 3% by weight as $P_2O_5$. The amount of the tartaric acid added was 1.3 molar times of the total molar number of the metal of Group VI and the metal of Group VIII. The relative rate constant of the catalyst sample, as obtained in the same manner as in Example 1, is shown in the Table mentioned below.

EXAMPLE 4

Catalyst-D was prepared in the same manner as in Example 3, except that 119 g of glycolic acid was used as the complexing agent. Regarding the active metal contents in Catalyst-D thus obtained, Mo content was 22% by weight as MoO3, Co content was 4% by weight as CoO, and P content was 3% by weight as P2O5. The amount of the glycolic acid added was 2.7 molar times of the total molar number of the metals of Group VI and Group VIII. The relative rate constant of the catalyst sample, as obtained in the same manner as in Example 1, is shown in the Table mentioned below.

EXAMPLE 5

Catalyst-E was prepared in the same manner as in Example 3, except that 212.5 g of citric acid was used as the complexing agent. Regarding the active metal contents in Catalyst-E thus obtained, Mo content was 22% by weight as MoO3, Co content was 4% by weight as CoO, and P content was 3% by weight as P2O5. The amount of the citric acid added was 0.87 molar time of the total molar number of the metals of the Group VI and the Group VIII. The relative rate constant of the catalyst sample, as obtained in the same manner as in Example 1, is shown in the Table mentioned below.

EXAMPLE 6

Catalyst-F was prepared in the same manner as in Example 3, except that 205 g of malic acid was used as the complexing agent. Regarding the active metal contents in Catalyst-F thus obtained, Mo content was 22% by weight as MoO3, Co content was 4% by weight as CoO, and P content was 3% by weight as P2O5. The amount of the malic acid added was 1.3 molar times of the total molar number of the metals of Group VI and Group VIII. The relative rate constant of the catalyst sample, as obtained in the same manner as in Example 1, is shown in the Table mentioned below.

EXAMPLE 7

Catalyst-G was prepared in the same manner as in Example 3, except that 36 g of nickel carbonate (Ni content: 40% by weight) was sued in place of cobalt carbonate and that 236 g of glycolic acid was used as the complexing agent. Regarding the active metal contents in Catalyst-G thus obtained, Mo content was 22% by weight as MoO3, Ni content was 4% by weight as NiO, and P content was 3% by weight as P2O5. The amount of the glycolic acid added was 2.7 molar times of the total molar number of the metals of Group VI and Group VIII. The relative rate constant of the catalyst sample, as obtained in the same manner as in Example 1, is shown in the Table mentioned below.

EXAMPLE 8

Catalyst H was prepared in the same manner as in Example 7, except that 400 g of titania powder (having a specific surface area of 220 $m^2/g$ and a pore capacity of 0.45 ml/g) was used as the catalyst carrier. Regarding the active metal contents in Catalyst-H thus obtained, Mo content was 22% by weight as MoO3, Ni content was 4% by weight as NiO, and P content was 3% by weight as P2O5. The amount of the glycolic acid added was 2.7 molar times of the total molar number of the metals of Group VI and Group VIII. The relative rate constant of the catalyst sample, as obtained in the same manner as in Example 1, is shown in the Table mentioned below.

EXAMPLE 9

250 ml of an aqueous solution of active metals, comprising 124 g of molybdenum trioxide, 36 g of nickel carbonate (Ni content: 49% by weight), 238 g of glycolic acid and water, was added to 400 g of $\gamma$-alumina powder (having a specific surface area of 280 $m^2/g$ and a pore capacity of 0.75 ml/g), and kneaded under heat at 80° C. The resulting blend was shaped into a cylinder form having a diameter of 1.6 mm through an extruder. This was then dried at 100° C. for 16 hours to obtain a catalyst sample (Catalyst-I). Regarding the active metal contents in Catalyst-I, Mo content therein was 22% by weight as MoO3 and Ni content therein was 4% by weight as NiO. The amount of the glycolic acid added was 2.7 molar times of the total molar number of the metal of Group VI and the metal of Group VIII. The relative rate constant of the catalyst sample, as obtained in the same manner as in Example 1, is shown in the Table mentioned below.

EXAMPLE 10

Catalyst J was prepared in the same manner as in Example 9, except that 27 g of 85% phosphoric acid was added to the aqueous solution of active metals. Regarding the active metal contents in Catalyst-J thus obtained, Mo content was 22% by weight as MoO3, Ni content was 4% by weight as NiO, and P content was 3% by weight as P2O5. The amount of the glycolic acid added was 2.7 molar times of the total molar number of the metals of Group VI and the Group VIII. The relative rate constant of the catalyst sample, as obtained in the same manner as in Example 1, is shown in the Table mentioned below.

COMPARATIVE EXAMPLE 1

In the same manner as in Example 1, 300 ml of an aqueous solution, comprising 124 g of molybdenum trioxide, 36 g of cobalt carbonate, 27 g of 85% phosphoric acid, 222 g of EDTA, 5 g of 28% aqueous ammonia and water, was added to 1000 g of alumina hydrate and kneaded under heat at 80° C. The resulting blend was shaped into a cylindrical form having a diameter of 1.6 mm through an extruder, which was then dried at 100° C. for 16 hours to obtain a catalyst sample (Catalyst-K). Regarding the active metal contents in Catalyst-K thus obtained, Mo content was 22% by weight as $MoO_3$, Co content was 4% by weight as CoO, and P content was 3% by weight as $P_2O_5$. The amount of EDTA added was 0.6 molar time of the total molar number of the metals of Group VI and Group VIII. The relative rate constant of the catalyst sample, as obtained in the same manner as in Example 1, is shown in the Table mentioned below.

COMPARATIVE EXAMPLE 2

Catalyst-L was prepared in the same manner as in Comparative Example 1, except that 182 g of ethylenediamine was used in place of EDTA. Regarding the active metal contents in Catalyst-L thus obtained, Mo content was 22% by weight as $MoO_3$, Co content was 4% by weight as CoO, and P content was 3% by weight as $P_2O_5$. The amount of the ethylenediamine added was 2.6 molar times of the total molar number of the metals of Group VI and Group VIII. The relative rate constant of the catalyst sample, as obtained in the same manner as in Example 1, is shown in the Table mentioned below.

| Example No. | Catalyst | Relative Rate Constant |
|---|---|---|
| Example 1 | A | 190 |
| Example 2 | B | 235 |
| Example 3 | C | 167 |
| Example 4 | D | 225 |
| Example 5 | E | 200 |
| Example 6 | F | 220 |
| Example 7 | G | 220 |
| Example 8 | H | 155 |
| Example 9 | I | 200 |
| Example 10 | J | 244 |
| Comparative Example 1 | K | 120 |
| Comparative Example 2 | L | 100 |

In accordance with the present invention, there is provided a method of preparing a catalyst for hydrogenation of a crude hydrocarbon oil in which a hydroxycarboxylic acid is added a a complexing agent to metals of Group VI and Group VIII of the Periodic Table and optionally phosphoric acid is further added thereto, and the resulting blend is kneaded and shaped and then dried at a temperature not higher than 200° C. The catalyst of the invention is usable for high hydrogenation of a hydrocarbon oil for deep desulfurization or denitrogenation of the same. Therefore, the catalyst may sufficiently satisfy the requirement of reducing the sulfur content in a light oil as one advantageous merit. As another merit, the method of the present invention is free from presulfurization of generating any harmful and toxic gas, and the catalyst of the present invention may stably be carried on the carrier.

While the invention has been described in detail and with reference to specific embodiments thereof, it will be apparent to one skilled in the art that various changes and modifications can be made therein without departing from the spirit and scope thereof.

What is claimed is:

1. A method of preparing a catalyst for the hydrogenation of a hydrocarbon oil without calcination which consists of the steps of (a) providing a carrier substance consisting essentially of at least one of an inorganic oxide and an inorganic oxide hydrate, (b) contacting said carrier substance with an aqueous solution containing ions of a metal from Group VI of the Periodic Table, ions of a metal from Group VIII of the Periodic Table and hydrocarboxylic acid to form a blend, (c) kneading and shaping said blend, and (d) heating said blend to a temperature not higher than 200° C.

2. The method of preparing a catalyst for hydrogenation of a hydrocarbon oil as claimed in claim 1, in wherein the metal of Group VI of the Periodic Table is at least one selected from the group consisting of Mo and W.

3. The method of preparing a catalyst for hydrogenation of a hydrocarbon oil as claimed in claim 1, in wherein the metal of Group VIII of the Periodic Table is at least one selected from the group consisting of Co and Ni.

4. The method of preparing a catalyst for hydrogenation of a hydrocarbon oil as claimed in claim 1, wherein the hydroxycarboxylic acid is selected from the group consisting of glycolic acid, hydroxypropionic acid, hydroxybutyric acid, hydroxyhexanoic acid, tartaric acid, malic acid, glyceric acid, citric acid and gluconic acid.

5. The method of preparing a catalyst for hydrogenation of a hydrocarbon oil as claimed in claim 1, wherein the amount of the metal of Group VI of the Periodic Table as carried on the carrier is from 5 to 30% by weight as its oxide.

6. The method of preparing a catalyst for hydrogenation of a hydrocarbon oil as claimed in claim 1, wherein the amount of the metal of Group VIII of the Periodic Table as carried on a carrier is from 1 to 8% by weight as its oxide.

7. The method of preparing a catalyst for hydrogenation of a hydrocarbon oil as claimed in claim 1, wherein the carrier substance is selected from the group consisting of alumina, silica, titania, zirconia, and their hydrates.

8. A method of preparing a catalyst for the hydrogenation of a hydrocarbon oil without calcination which consists of the steps of (a) providing a carrier substance consisting essentially of at least one of an inorganic oxide and an inorganic oxide hydrate, (b) contacting said carrier substance with an aqueous solution containing ions of a metal from Group VI of the Periodic Table, ions of a metal from Group VIII of the Periodic Table, hydrocarboxylic acid and phosphoric acid or a soluble salt thereof to form a blend, (c) kneading and shaping said blend, and (d) heating said blend to a temperature not higher than 200° C.

9. The method of preparing a catalyst for hydrogenation of a hydrocarbon oil as claimed in claim 8, wherein the metal of Group VI of the Periodic Table is at least one selected from the group consisting of Mo and W.

10. The method of preparing a catalyst for hydrogenation of a hydrocarbon oil as claimed in claim 8, wherein the metal of Group VIII of the Periodic Table is at least one selected from the group consisting of Co and Ni.

11. The method of preparing a catalyst for hydrogenation of a hydrocarbon oil as claimed in claim 8, wherein the hydroxycarboxylic acid is selected from the group consisting of glycolic acid, hydroxypropionic acid, hydroxybutyric acid, hydroxyhexanoic acid, tartaric acid, malic acid, glyceric acid, citric acid and gluconic acid.

12. The method of preparing a catalyst for hydrogenation of a hydrocarbon oil as claimed in claim 8, wherein the amount of the metal of Group VI of the Periodic Table as carried on the carrier is from 5 to 30% by weight as its oxide.

13. The method of preparing a catalyst for hydrogenation of a hydrocarbon oil as claimed in claim 8, wherein the amount of the metal of Group VIII of the Periodic Table as carried on the carrier is from 1 to 8% by weight as its oxide.

14. The method of preparing a catalyst for hydrogenation of a hydrocarbon oil as claimed in claim 8, wherein the phosphoric acid or soluble salt thereof is selected from the group consisting of metal-phosphoric acid, pyro-phosphoric acid, ortho-phosphoric acid, tri-phosphoric acid, tetraphosphoric acid and nickel phosphate.

15. The method of preparing a catalyst for hydrogenation of a hydrocarbon oil as claimed in claim 8, wherein the amount of the phosphoric acid to be in the catalyst is from 0.1 to 8% by weight as $P_2O_5$.

16. The method of preparing a catalyst for hydrogenation of a hydrocarbon oil as claimed in claim 8, wherein the catalyst carrier is selected from the group consisting of alumina, silica, titania, zirconia, and their hydrates.

* * * * *